US00RE50565E

(19) United States
(12) Reissued Patent
Hill

(10) Patent Number: US RE50,565 E
(45) Date of Reissued Patent: *Sep. 2, 2025

(54) MODULAR PLASMA REFORMER TREATMENT SYSTEM

(71) Applicant: PlasmaFlow, LLC, Lafayette, CO (US)

(72) Inventor: Garrett Hill, Boulder, CO (US)

(73) Assignee: Rimere, LLC, Lafayette, CO (US)

( * ) Notice: This patent is subject to a terminal disclaimer.

(21) Appl. No.: 17/321,940

(22) Filed: May 17, 2021

Related U.S. Patent Documents

Reissue of:
(64) Patent No.: 10,293,303
Issued: May 21, 2019
Appl. No.: 16/049,795
Filed: Jul. 30, 2018

U.S. Applications:
(62) Division of application No. 17/319,466, filed on May 13, 2021, which is an application for the reissue of Pat. No. 10,293,303.

(60) Provisional application No. 62/538,177, filed on Jul. 28, 2017.

(51) Int. Cl.

| | |
|---|---|
| ***B01D 53/32*** | (2006.01) |
| ***B01D 53/26*** | (2006.01) |
| ***B01D 53/92*** | (2006.01) |
| ***F01N 3/01*** | (2006.01) |

(Continued)

(52) U.S. Cl.
CPC ..... *B01D 53/32* (2013.01); *B01D 53/261* (2013.01); *B01D 53/92* (2013.01); *F01N 3/01* (2013.01); *F01N 3/037* (2013.01); *F01N 3/0892* (2013.01); *B01D 2257/404* (2013.01); *B01D 2257/502* (2013.01); *B01D 2257/702* (2013.01); *F01N 2240/22* (2013.01); *F01N 2240/28* (2013.01); *F01N 2240/30* (2013.01)

(58) Field of Classification Search
CPC ..... F01N 3/01; F01N 3/0892; F01N 3/037; F01N 2240/22; F01N 2240/30; F01N 2240/28; B01D 53/32; B01D 53/92; B01D 53/261; B01D 2257/702; B01D 2257/502; B01D 2257/404; Y02T 10/12
See application file for complete search history.

(56) References Cited

U.S. PATENT DOCUMENTS

| | | | |
|---|---|---|---|
| 4,585,920 | A | 4/1986 | Hoog et al. |
| 4,939,424 | A | 7/1990 | Kieser |
| 5,003,152 | A | 3/1991 | Matsuo |

(Continued)

FOREIGN PATENT DOCUMENTS

| | | | |
|---|---|---|---|
| CN | 101844744 | A * | 9/2010 |
| CN | 205812485 | | 12/2016 |

(Continued)

*Primary Examiner* — Elizabeth L Mckane
(74) *Attorney, Agent, or Firm* — Fish IP Law, LLP

(57) ABSTRACT

A modular plasma treatment system has interchangeable and easily accessible inner and outer electrodes that concentrically nest within an outer housing of one or more plasma reformers. The inner and outer electrodes have self-centering features that allow for blind-fitting of the interchangeable inner and outer electrodes during electrode replacement and maintenance. A plurality of reformers that generate different types of plasmas are preferably arranged serially to allow for a mixture of separate plasmas within the same reaction area and to increase utilization of short-lived radicals.

32 Claims, 16 Drawing Sheets

(51) Int. Cl.

| | |
|---|---|
| ***F01N 3/037*** | (2006.01) |
| ***F01N 3/08*** | (2006.01) |

(56) References Cited

U.S. PATENT DOCUMENTS

| | | | | |
|---|---|---|---|---|
| 5,010,276 | A | 4/1991 | Echizen | |
| 5,887,554 | A | 3/1999 | Cohn et al. | |
| 5,993,761 | A | 11/1999 | Czernichowski et al. | |
| 6,158,384 | A | 12/2000 | Ye | |
| 6,176,078 | B1 * | 1/2001 | Balko | B01D 53/9431 60/274 |
| 6,190,507 | B1 | 2/2001 | Whealton et al. | |
| 6,994,830 | B1 | 2/2006 | Raybone et al. | |
| 7,025,939 | B1 | 4/2006 | Hall et al. | |
| 8,272,206 | B2 * | 9/2012 | Lee | F01N 3/025 60/275 |
| 9,095,835 | B2 | 8/2015 | Skoptsov et al. | |
| 9,241,396 | B2 | 1/2016 | Foret | |
| 9,393,543 | B2 | 7/2016 | Novoselov | |
| 9,889,218 | B2 | 2/2018 | Morfill et al. | |
| 10,183,881 | B1 | 1/2019 | Fraser et al. | |
| 10,188,119 | B2 | 1/2019 | Foret | |
| 10,308,512 | B2 | 6/2019 | Tanner et al. | |
| 10,987,735 | B2 | 4/2021 | Hadidi et al. | |
| 2003/0140622 | A1 * | 7/2003 | Taylor, III | B01D 53/9431 60/295 |
| 2004/0134890 | A1 | 7/2004 | Uhm et al. | |
| 2005/0208446 | A1 * | 9/2005 | Jayne | F02B 23/04 431/264 |
| 2005/0236374 | A1 | 10/2005 | Blankenship | |
| 2005/0255011 | A1 * | 11/2005 | Greathouse | B01J 4/002 422/186.21 |
| 2006/0070372 | A1 | 4/2006 | Lucas et al. | |
| 2006/0185352 | A1 | 8/2006 | Twigg | |
| 2006/0201139 | A1 * | 9/2006 | Khadiya | F01N 3/035 60/286 |
| 2008/0276600 | A1 * | 11/2008 | Lee | F01N 3/025 60/286 |
| 2009/0129993 | A1 * | 5/2009 | Kim | B01D 53/944 422/168 |
| 2009/0165953 | A1 | 7/2009 | Seeley et al. | |
| 2010/0135879 | A1 * | 6/2010 | Roesch | B01D 53/945 423/213.5 |
| 2011/0298376 | A1 | 12/2011 | Kanegae et al. | |
| 2012/0073756 | A1 | 3/2012 | Yamazawa | |
| 2014/0021035 | A1 * | 1/2014 | Rabinovich | B01J 19/08 204/170 |
| 2014/0191450 | A1 | 7/2014 | Boyman | |
| 2014/0209243 | A1 | 7/2014 | Kim | |
| 2016/0295676 | A1 | 10/2016 | Patelli et al. | |
| 2017/0145890 | A1 | 5/2017 | Hill et al. | |
| 2017/0145980 | A1 | 5/2017 | Hill et al. | |
| 2018/0297122 | A1 | 10/2018 | Hadidi et al. | |
| 2019/0046947 | A1 | 2/2019 | Strom et al. | |
| 2019/0047865 | A1 | 2/2019 | Zeller et al. | |
| 2019/0177835 | A1 | 6/2019 | Baduvamanda et al. | |
| 2020/0312639 | A1 | 10/2020 | Tom et al. | |
| 2020/0402768 | A1 | 12/2020 | Stowell et al. | |
| 2022/0021290 | A1 | 1/2022 | Mills | |

FOREIGN PATENT DOCUMENTS

| | | | | |
|---|---|---|---|---|
| DE | 102011077788 | | | 12/2012 |
| GB | 2274412 | A | * | 7/1994 |
| GB | 2282738 | A | * | 4/1995 |
| JP | 201186912 | | | 4/2011 |
| JP | 5648349 | | | 11/2014 |
| KR | 20160097438 | | | 8/2016 |
| WO | WO00/43102 | A2 | * | 7/2000 |
| WO | WO 0192694 | A1 | * | 12/2001 |
| WO | WO-2011033927 | A1 | | 3/2011 |

* cited by examiner

MODULAR PLASMA REFORMER TREATMENT SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of priority to U.S. provisional application No. 62/538,177 filed on Jul. 28, 2017. This and all other extrinsic references referenced herein are incorporated by reference in their entirety. *More than one reissue application has been filed for U.S. Pat. No. 10,293,303. The reissue applications are application Ser. Nos. 17/319,466, 17/321,940, 17/324,846 and 17/324,933, all of which are divisional reissues of U.S. Pat. No. 10,293, 303.*

FIELD OF THE INVENTION

The field of the invention is plasma reformers.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Internal combustion engine exhaust streams contain substances that may be harmful to both humans and machinery if left untreated. However, known reformers to treat exhaust streams are difficult to maintain and don't allow easy access to the fundamental components of the reformers. For example, U.S. Pat. No. 6,994,830 to Raybone and U.S. Pat. No. 7,025,939 to Hall both teach reformers for plasma treatment of gases with electrodes supported within a dielectric tube enclosed in a single enclosure without any easily de-coupleable fasteners that allow service members to maintain the fundamental components. Maintenance of such reformers is time-consuming, expensive, and is sometimes impossible without seriously damaging the reformer walls itself—particularly when electrodes need to be maintained or replaced.

Thus, there remains a need for a system and method for improved reformers that are easy to construct, maintain, and assemble/disassemble.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which a modular plasma treatment system is built with interchangeable and easily accessible inner and outer electrodes that nest within an outer housing of one or more plasma reformers.

As used herein, a "reformer" comprises a reactor having a reaction zone that reforms substances within an input stream from one substance to another substance—preferably another substance that is less harmful to humans and/or machinery. Exemplary substances to be reformed include, for example, particulate matter (PM), carbon monoxide (CO), nitrogen monoxide (NO), nitrogen dioxide, ($NO_2$) and hydrocarbons (HC) which can be altered to a different substance when introduced to a reactive molecular species, or Radical, created by the reformer such as hydrogen, ozone or oxygen. Such substances, if not passed through a reformer, could react with $OH^-$ radicals created when water vapor inside of an exhaust stream is passed through plasma of sufficient energy, which can create harmful substances such as nitrous acid ($HNO_2$) or nitric acid ($HNO_3$).

As used herein, an "input stream" comprises any stream of flowable substances capable of being directed through a conduit, such as a gas, a liquid, a gas having smaller liquid or solid particulate matter (e.g. less than 3 mm, 2 mm, 1 mm, 500 um, 50 um, 10 um, or even 1 um in length), or a liquid having a smaller solid particulate matter.

As used herein, the term Hybrid Plasma Reformer (HPR), which is a reformer having 2 or more different types of plasmas in the same reaction zone. Typically such reformers are built serially downstream another reformer, for example a dielectric Barrier Discharge (DBD) reformer that generates DBD plasma placed downstream of a rotating glide-arc reformer that generates glide-arc plasma.

Exemplary reformers comprise concentric inner electrodes within outer electrodes within an outer housing, which all nest within one another within the outer housing. The dimensions of the outer housing, inner electrodes, and outer electrodes are preferably configured such that, when each is set in place within one another, the inner module does not "substantially move" when set in place. As used herein, "substantially move" comprises moving within 1 mm relative to one another in any direction when dropped on concrete from 5, 10, 20, or 30 cm. in the air. Coupling the inner electrodes and outer electrodes to a voltage transformer, for example a high voltage transformer that provides a voltage difference of at least 1,000, 10,000, 20,000, or even 30,000 volts between the inner electrodes and outer electrodes, the reformer generates plasma between the electrodes to form a reaction zone for streams sent through the reformer. Such voltage power transformers are preferably integrated with a feedthrough of the reformer to deliver power from the voltage power transformer directly to an inner electrode via the feedthrough.

By providing interchangeable inner electrodes and outer electrodes capable of fungibly nesting within the outer housing of a reformer, the system allows for electrodes to be changed to accommodate different voltage differences for different types of plasmas, for example DBD plasma, glide-arc plasma, corona, inductively coupled, and microwave plasma. In some embodiments, the inner electrodes have dimensions that are substantially identical to one another and outer electrodes have dimensions that are substantially identical to one another such that any inner electrode could be fungible with any other inner electrode and any outer electrode can be fungible with any other outer electrode. In other embodiments, only the outer dimensions of the outer electrodes are substantially identical to one another such that the inner dimensions of the outer electrodes and the outer dimensions of the inner electrodes could be shaped differently to accommodate different reformer needs. As used herein, electrodes that are shaped "substantially identical" to one another could replace one another within a nested reformer embodiment without substantially moving relative to one another when set in place.

In some embodiments, the inner dimensions of the outer housing and the outer dimensions of the outer electrodes, and/or the inner dimensions of the outer electrodes and outer dimensions of the inner electrodes, are shaped to have self-centering geometric features that center the inner portion with respect to the outer portion as they are set in place. Such self-centering geometric features could be, for example, a tapered inner wall that hugs the inner portion tighter as the inner portion is slid in place, or a tapered exterior cross-section of the inner portion that expands into a tighter fit as the inner portion is slid in place. Such sliding self-centering features allow for the nested electrodes to have a blind-mate connection (a connection that allows a person to center an electrode in place without need for precise orientation of threads, notches, or other pluralities of protrusions/recesses before sliding an electrode in place). Preferably, the inner apexes of the feedthrough and outlet flanges of the reformer fundamental components comprises self-centering features that allow for such a sliding blind mate between the concentric system components. As used herein, a "fundamental component" of a reformer comprises the outer housing, the inner electrode, and the outer electrode.

Electrodes sized and shaped to generate different types of plasmas could have distinct internal or external geometric features from one another. For example, an outer electrode of a DBD reformer could comprise interior conductive projections that generate electric field gradients between points of the conductive projections. While such conductive projections could be within the interior of the electrode in any manner (e.g. 3-D printed, welded), in preferred embodiments the conductive projections could comprise conductive ferrous screws screwed into holes of the outer electrode. Preferably, the conductive projections comprise different dimensions (lengths, widths, heights, geometric patterns), to provide differing electric field gradients to precipitate particulate matter having different properties.

In some embodiments, inner and/or outer surface features of the inner and outer electrode, and/or inner surface features of the outer housing, could be configured to alter the air pressure in various zones of the reformer to direct input streams in a cyclone motion to points of highest energy density within the excitation chamber. For example, perforations in the wall of the outer electrode could get wider at near the reaction zone where the inner electrodes and outer electrodes are closest to one another, decreasing the air pressure within that zone to help direct the input stream towards the points with the highest energy density. Altering surface features of the fundamental components could be done in any manner known in the art to help direct input streams towards areas where they are the most effective.

As previously stated, reformers are preferably disposed serially to one another such that a plurality of plasmas are present within the same reaction zone. This increases utilization of short-lived singlet oxygen radicals, and increases the control of the amount and type of reactive nitrogen and reactive oxygen radicals that are created. For example, when a stream is below the PM oxidation temperature of $NO_2$ (200-500c), ozone can be selectively produced and utilized for PM oxidation, or when the stream is above the temperature where ozone is incapable of being transported relatively long distances to the PM inside a Diesel Particulate Filter (DPF), $NO_2$ can be selectively produced. Exemplary serialized reformers include, for example, a DBD reformer placed downstream to a glide-arc reformer. The glide-arc reformer preferably has a rotating glide-arc that directs the output stream to rotate in a vortex such that heavier, particulate matter is directed towards the walls of the reaction zone, further ensuring that the heavier particulate matter is directed towards points of highest energy density inside the excitation chamber.

Magnetic fields and/or microwaves could be directed towards the reaction chamber using magnets, electromagnetic resonators and/or microwave generators, respectively. In some embodiments, a magnetic field generator could target its magnetic field to be centrally targeted around co-axial electrodes that discharge into a plasma of any resonator of the system. In some embodiments, a particulate filter that expels the output stream of any reformer could be placed above the output stream to transfer waste heat from the output stream to an oxidant conduit.

Preferably, air that is introduced to the reformer is predried using an air driver that receives intake air from an air source, such as a blower or an on-board turbocharger, and outputs dried air that is introduced to an inlet of the initial reformer. Such air drivers could use a desiccant, such as silica gel, to remove water vapor from the intake air.

Contemplated systems could be used to reform any stream comprising gaseous, liquid and particulate matter, for example an output exhaust of an internal combustion engine to generate CO2 and H2O, an oil well flare to generate synthesis gas (H2 and CO), air and water treatment system to creates ozone and NOx, or an atmospheric control system for a spaceship to generate oxygen from $CO_2$.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

Figure 1:
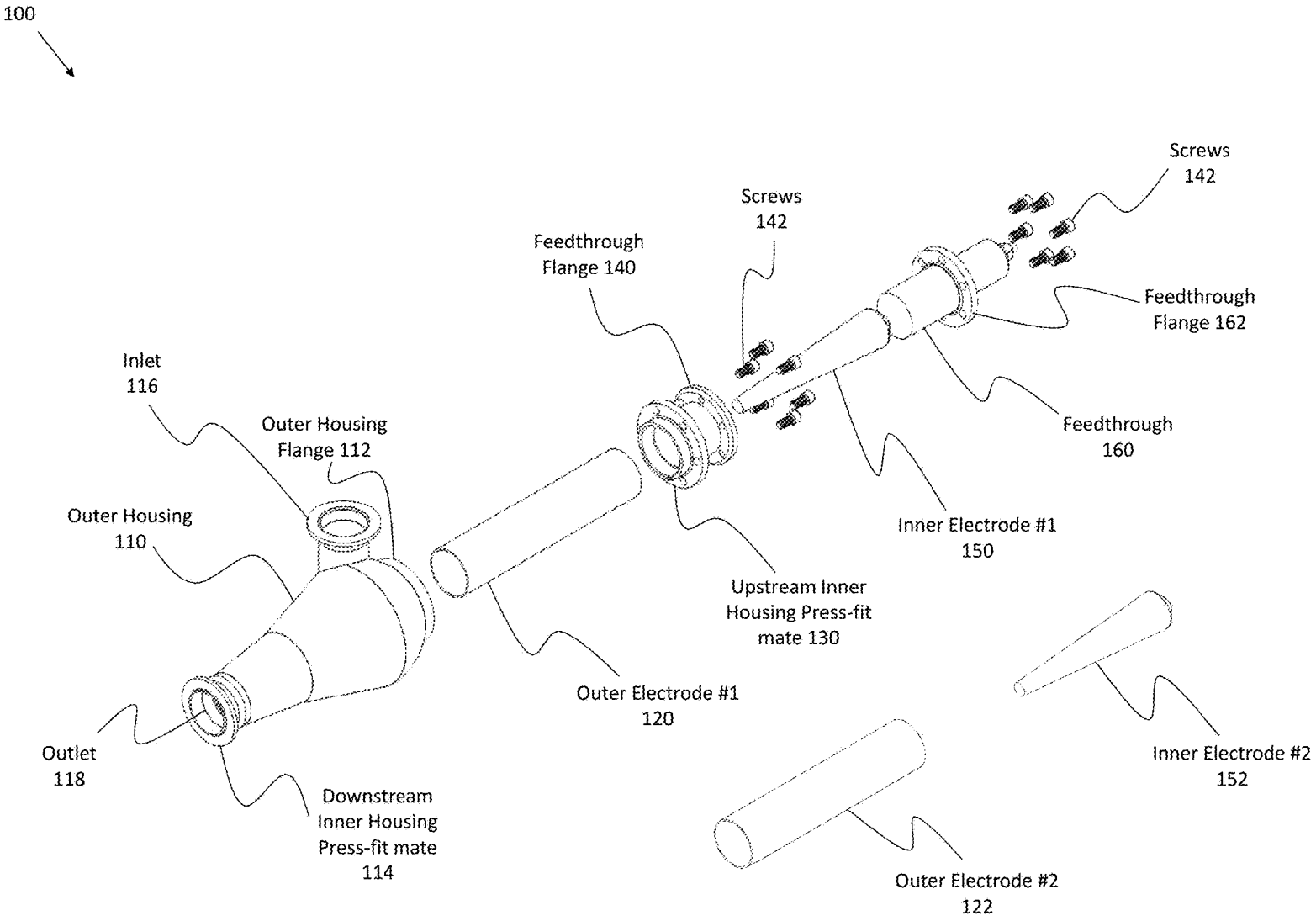
FIG. 1 is an exploded view of an exemplary reformer having a plurality of inner and outer electrodes.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One should appreciate that the disclosed techniques provide many advantageous technical effects including providing a modular system for ease of maintenance, accessibility, and replacement of fundamental components of plasma treatment systems. Blind-mate connections allow for the ease of placement of inner and outer electrodes without necessitating a high degree of accuracy when putting the electrodes in place. The system architecture guides streams towards the highest energy density zones within the plasma reaction zones for optimal paths through the reaction zones. Having a plurality of plasmas within the same reaction zone increases utilization of short-lived singlet oxygen radicals, and increases the control of the amount and type of reactive nitrogen and reactive oxygen radicals that are created. By combining who different plasmas, such as glide-arc plasmas and DBD plasmas for $NO_2$ production eliminates the need for extremely high voltages that are required with a DBD plasma reformer—which eliminates the need for more expensive insulators and electronics. Utilizing microwave excitation techniques for the production of radicals increases the precision below the threshold of unwanted chemical production. Utilizing ambient air as a feedstock to produce the preferred oxidants with an integrated dryer removes hydrogen and sulfur sources from the air stream, which minimizes the creation of unwanted acidic chemicals as a byproduct. By placing filters/catalyst systems above heat-creating reformers and other modules of the system, the system uses heat exchange to increase the production efficiency of the radicals.

The inventive subject matter provides apparatus, systems, and methods in which a modular plasma treatment system is built with interchangeable and easily accessible inner and outer electrodes that nest within an outer housing of one or more plasma reformers.

In FIG. 1, a reformer 100 has an outer housing 110, outer electrode #1 120, outer electrode #2 122, inner electrode #1 150, and inner electrode #2 152. Outer housing 110 is a housing of a plasma reformer with inlet 116 for an input stream to enter reformer 100 and outlet 118 for an output stream to exit from. Outer housing 110 has a downstream inner housing press-fit mate 114 to an exhaust outlet (not shown) for ease of mating during maintenance. Other suitable coupling systems could be used to couple outlet 118 to an exhaust outlet (not shown), but preferably the coupling system does not require tools (e.g. press-fit systems, hand latches) or commonly available tools (e.g. a screwdriver, a wrench, a bolt socket) to ensure ease of maintenance. Outer housing flange 112 couples with upstream inner housing press-fit mate 130, and is screwed in place with screws 142 via feedthrough flange 140 and feedthrough flange 162. Again, other suitable coupling systems could be used such as those already named.

Outer electrode #1 120 and outer electrode #2 122 have substantially identical geometric features to allow for either electrode to be interchanged within outer housing 110. Similarly, inner electrode #1 and inner electrode #2 152 also have substantially identical geometric features, making them geometrically fungible. Preferably, outer electrode #2 122 comprises a different conductive material from outer electrode #2 122, and inner electrode #1 150 comprises a different conductive material from inner electrode #1 152, giving them different conductive properties from one another, and making outer electrode #1 120 and inner electrode #1 150 more appropriate for generating a first plasma and outer electrode #2 122 and inner electrode #2 152 more appropriate for generating a second plasma different from the first plasma. In other embodiments, the inner geometric features of outer electrode #2 122 may be different from the inner geometric features of outer electrode #1 120, such that the outer geometric features of inner electrode #2 152 are made to mate with the inner geometric features of outer electrode #2 122 and the outer geometric features of inner electrode #1 150 are made to mate with the inner geometric features of outer electrode #1 120.

Figure 2:
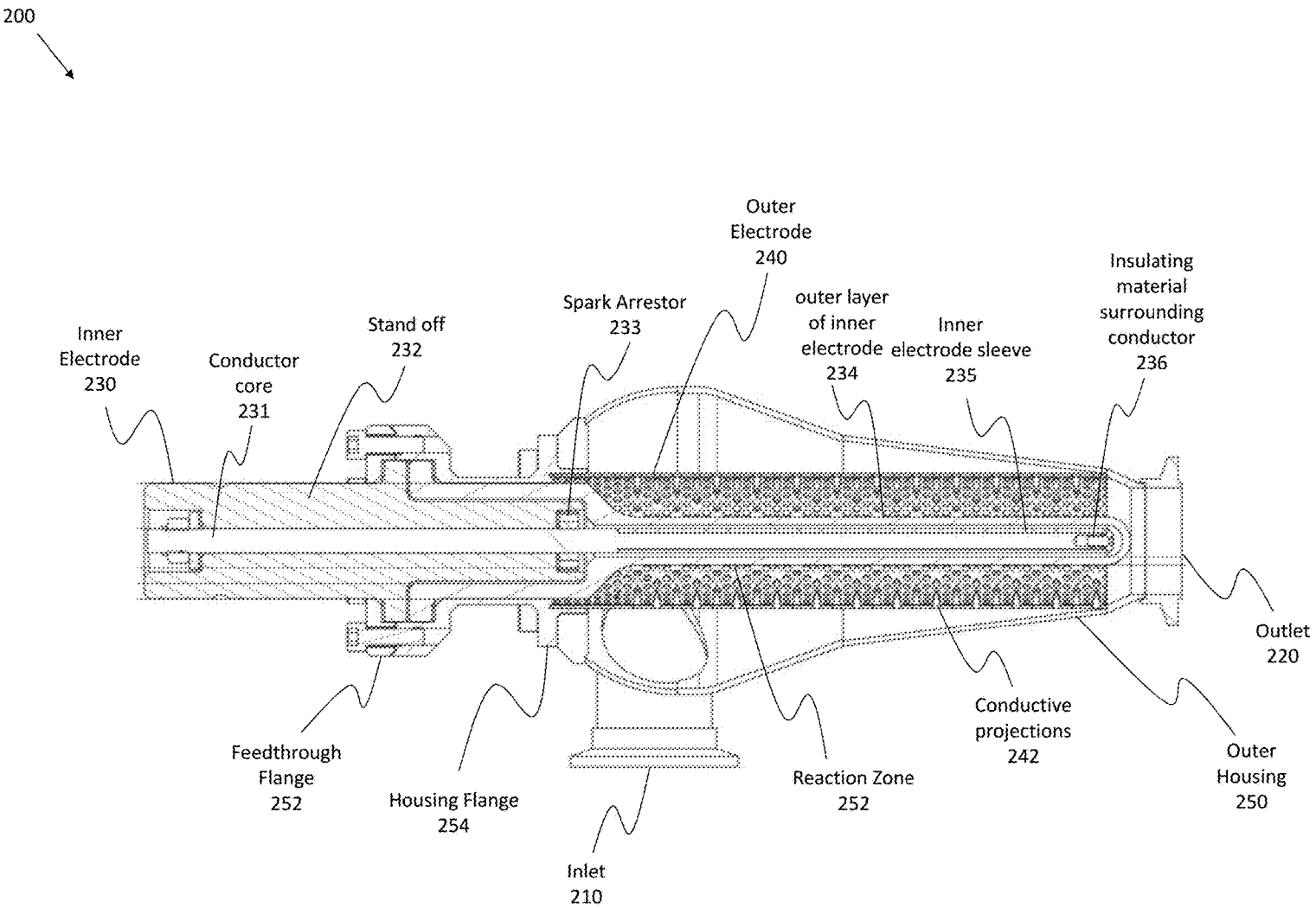
FIG. 2 is a cross-sectional view of an exemplary reformer.

In FIG. 2, a cross-sectional view of a reformer 200 is shown, having inlet 210, outlet 220, inner electrode 230, outer electrode 240, and outer housing 250. Here, each of the fundamental components have self-centering geometric features that centers the nested fundamental components relative to one another as they are set in place. The inner chamber of outer housing 250 is shaped to taper inwards towards the outer walls of outer electrode 240 such that as outer electrode 240 advances within the inner chamber of outer housing 250, outer electrode 240 self-centers in place and does not substantially move after being fully advanced within outer housing 250. Similarly, the outer walls of inner electrode 230 are tapered near the base to self-center inner electrode 240 within outer electrode 240 as inner electrode 230 advances in place. This improves the ability for the electrodes to be set in place without need for a high degree of accuracy or even for the installer to be looking inside reformer 200 during installation.

Inner electrode 230 comprises a conductor core 231 coupled to a voltage transformer (not shown) and has a stand off 232, spark arrestor 233, outer layer 234, sleeve 235, and insulating material 236. In a preferred embodiment, stand off 232 comprises a quartz stand off, outer layer 234 comprises a quartz outer layer, and insulating material 236 comprises a thin layer of quartz wool surrounding the conductor core 231, however, any insulating material, or materials, could be used depending on the needs of the reformer. Reaction zone 252 in between inner electrode 2130 and outer electrode 240 has a plurality of conductive projections 242 that each provide electric field gradients in between one another to precipitate particulate matter. Here, the conductive projections 242 are steel screw heads screwed into holes of outer electrode 240, however conductive projections 242 could be implemented in a plurality of ways, such as 3-D printed or welded in place. Preferably, conductive projections 242 have different dimensions from one another. Here, conductive projections 242 only have a difference in height, such that screws of the same width but different length can provide different electric field gradients to precipitate particulate matter having different properties from one another.

While reformer 200 shows electrodes with geometries most appropriate for a DBD plasma reformer, outer housing 250 could be utilized to generate other types of plasma by replacing the inner and outer electrodes set in place.

Figure 3:
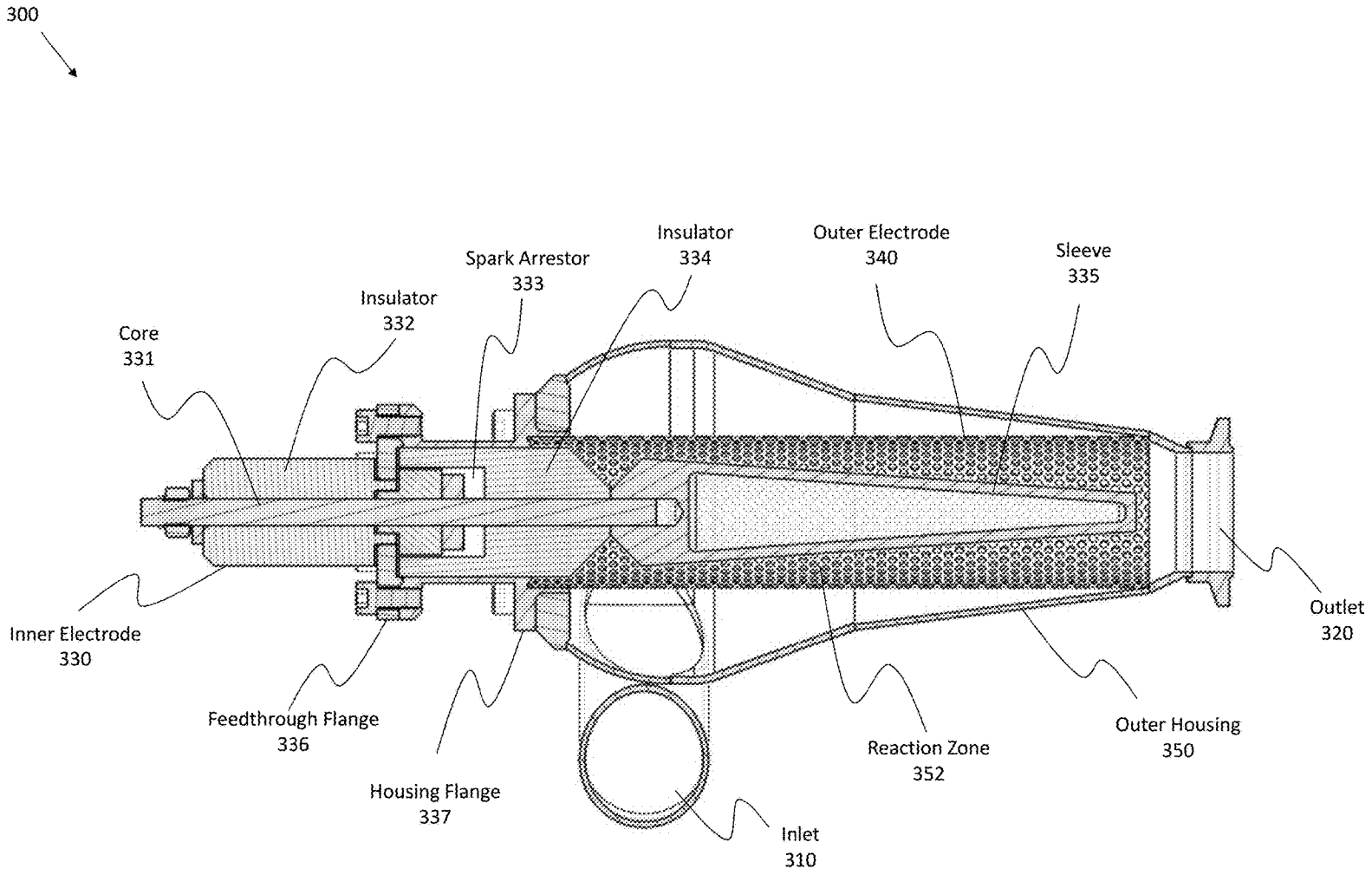
FIG. 3 is a cross-sectional view of an alternative exemplary reformer with alternative surface features.

In FIG. 3, reformer 300 has an inlet 310, outlet 320, inner electrode 330, outer electrode 340, and outer housing 350. Here, inner electrode 330 has a slightly different geometry to inner electrode 220, providing a self-centering outer wall that slowly tapers from the tip to the base of inner electrode 330. Here, also, outer electrode 340 has a different geometry to outer electrode 240, without the conductive projections of outer electrode 240. While inner electrode 330 has a different geometry to inner electrode 230, and outer electrode 340 has a different geometry to inner electrode 240, both sets of electrodes could be installed interchangeably in outer housing 250 or outer housing 350, allowing for functionally fungible electrode pairs if need be.

Inner electrode 330 has a conductive core 331 that mates with sleeve 335, and is coated with insulator 332 and 334 at its base, insulating spark arrestor 333 from external electromagnetic waves. Spark arrestor 333 allows for an overvoltage spark within a cavity, which is inside the feedthrough and not in the atmosphere or outside the reformer. Feedthrough flange 336 allows for a transformer (not shown) to provide voltage to core 331, while housing flange 337 allows for the transformer to provide voltage to outer electrode 340.

While reformer 300 shows electrodes with geometries most appropriate for a rotating glide-arc plasma reformer, outer housing 350 could be utilized to generate other types of plasma by replacing the inner and outer electrodes set in place.

Figure 4:
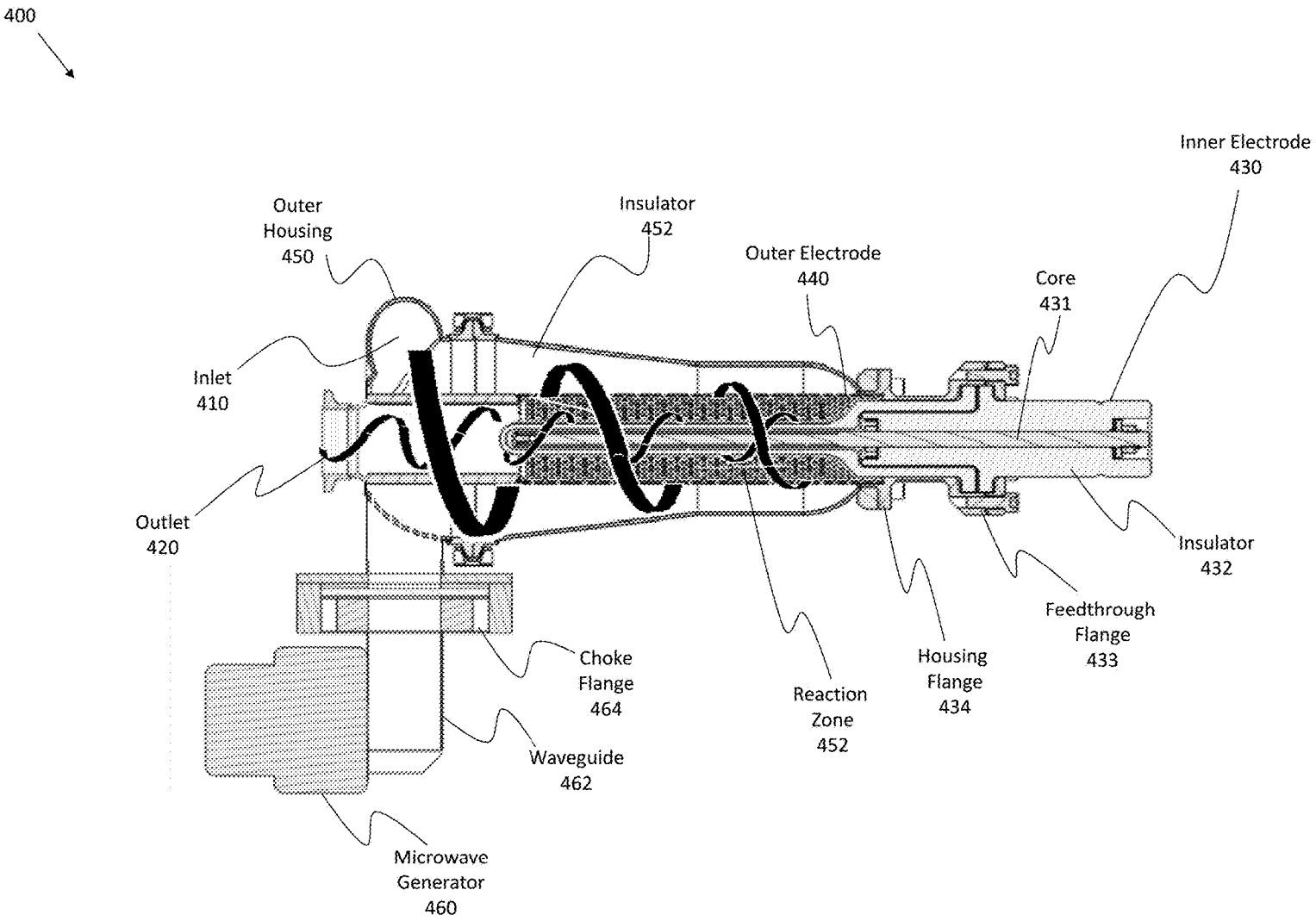
FIG. 4 is a cross-sectional view of an exemplary reformer having a microwave generator.

In FIG. 4, reformer 400 shows a reformer 400 having an inlet 410, outlet 420, inner electrode 430, outer electrode 440, and outer housing 450. Here, outer housing 450 has a waveguide 462 that guides microwaves from microwave generator 460 towards the area where inlet 410 and outlet 420 are, exposing the stream to microwave transmissions as the stream enters and exits reformer 400. Waveguide 462 is held in place by choke flange 464.

Inlet 410 guides the input stream in a circular vortex pattern about the outer reaction stream path into reaction zone 452 between outer electrode 440 and inner electrode 430. As the vortex pattern approaches the best of inner electrode 430, the densest portions of the stream flow along the inner wall of outer housing 250 and converge where the walls of outer electrode 440 and inner electrode 430 are the closest, and disperse in a vortex pattern within reaction zone 452 towards outlet 420. Inner electrode 430 has a core 431 surrounded by insulator 432, and feedthrough flange is conductively coupled to core 431 of inner electrode 430 while housing flange 434 is conductively coupled to outer electrode 440.

Figure 7:
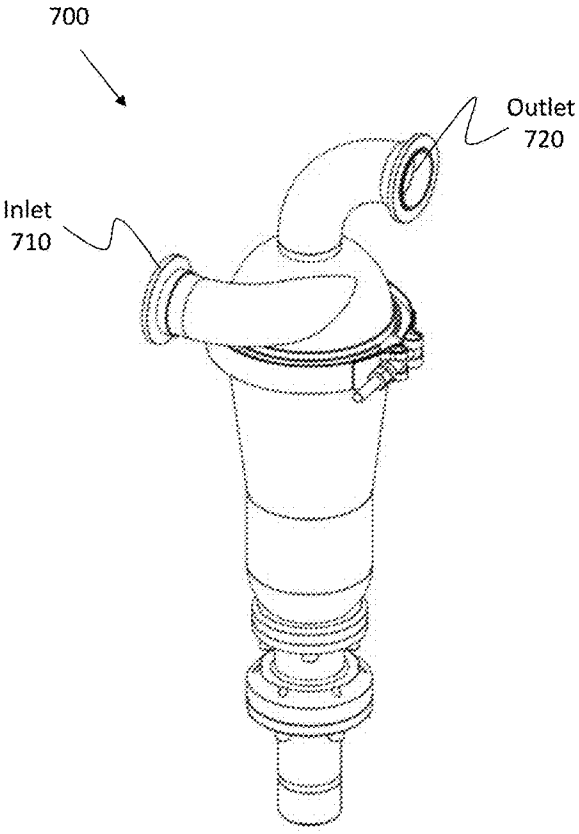
FIG. 7 shows an exterior plan view of an alternative exemplary reformer.
Figure 6:
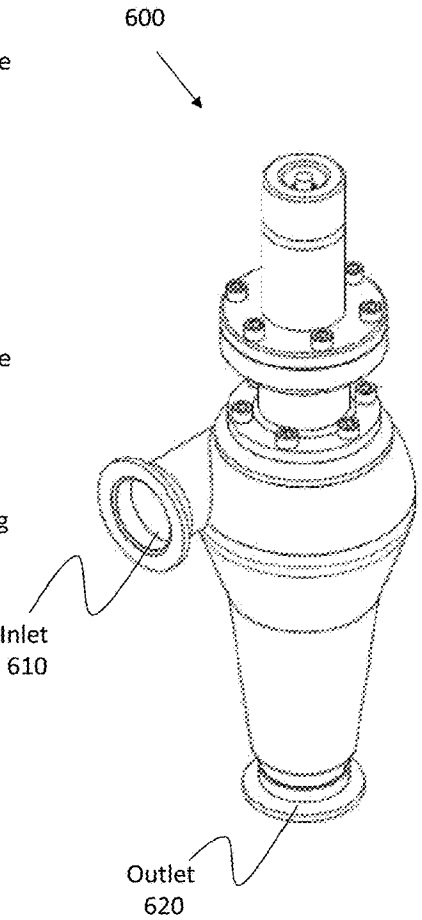
FIG. 6 shows an exterior plan view of an exemplary reformer.
Figure 5:
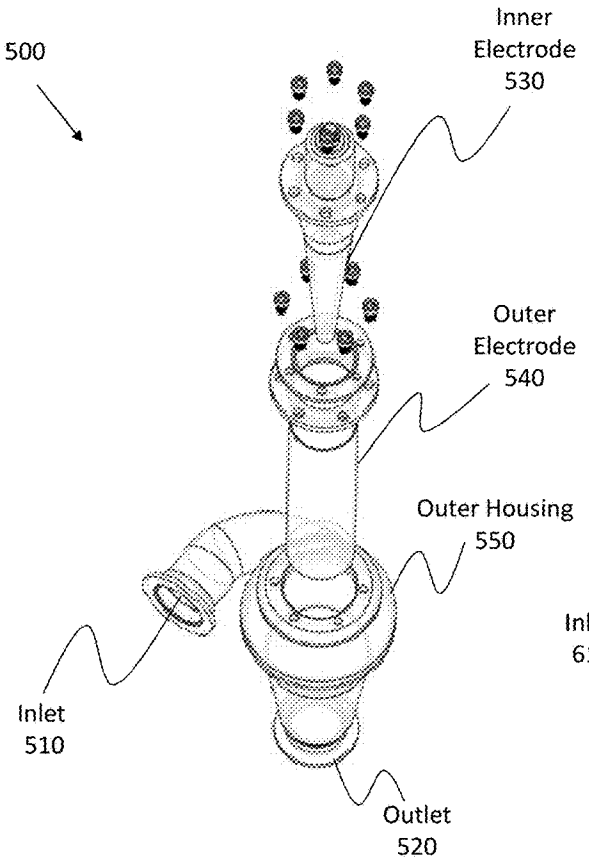
FIG. 5 shows an alternative view of the exploded view of the reformer of FIG. 1.

FIGS. 5-7 illustrate external views of exemplary reformer configurations. FIG. 5 shows an exploded view of reformer 500 having inner electrode 530, outer electrode 540, and outer housing 550, where the inlet and outlet are disposed close to one another, providing an optimal geometry for a single microwave generator to be pointed at a section where both the inlet and outlet streams pass. FIG. 6 shows a reformer 600 having an inlet 610 and an outlet 620 disposed on opposing sides of the reformer, illustrating a path along the longest length of reformer 600. FIG. 7 shows a reformer 700 having an inlet 710 and an outlet 720 on opposing sides of the reformer providing a more linear path optimal for chaining several reformers with one another.

Figure 8:
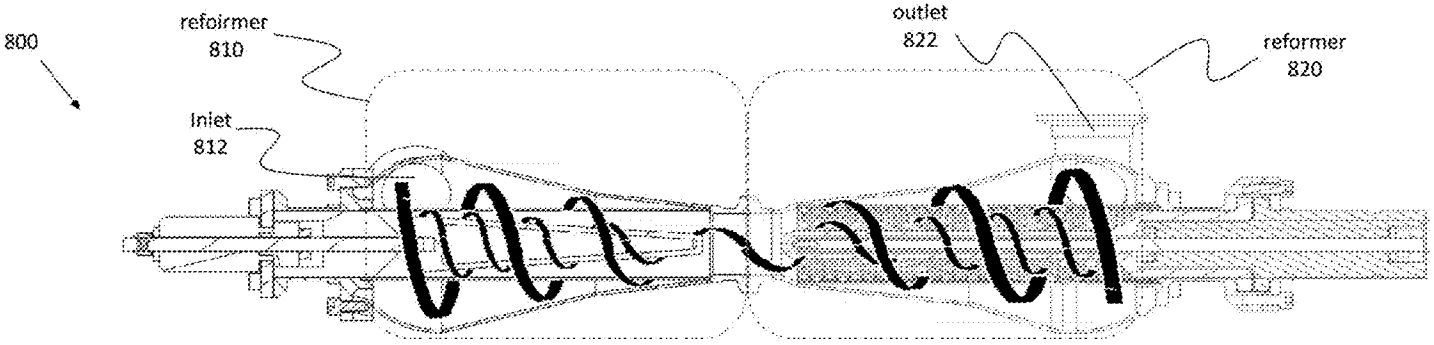
FIG. 8 shows a cross-sectional view of a plasma treatment system having two reformers serially coupled to one another.
Figure 9:
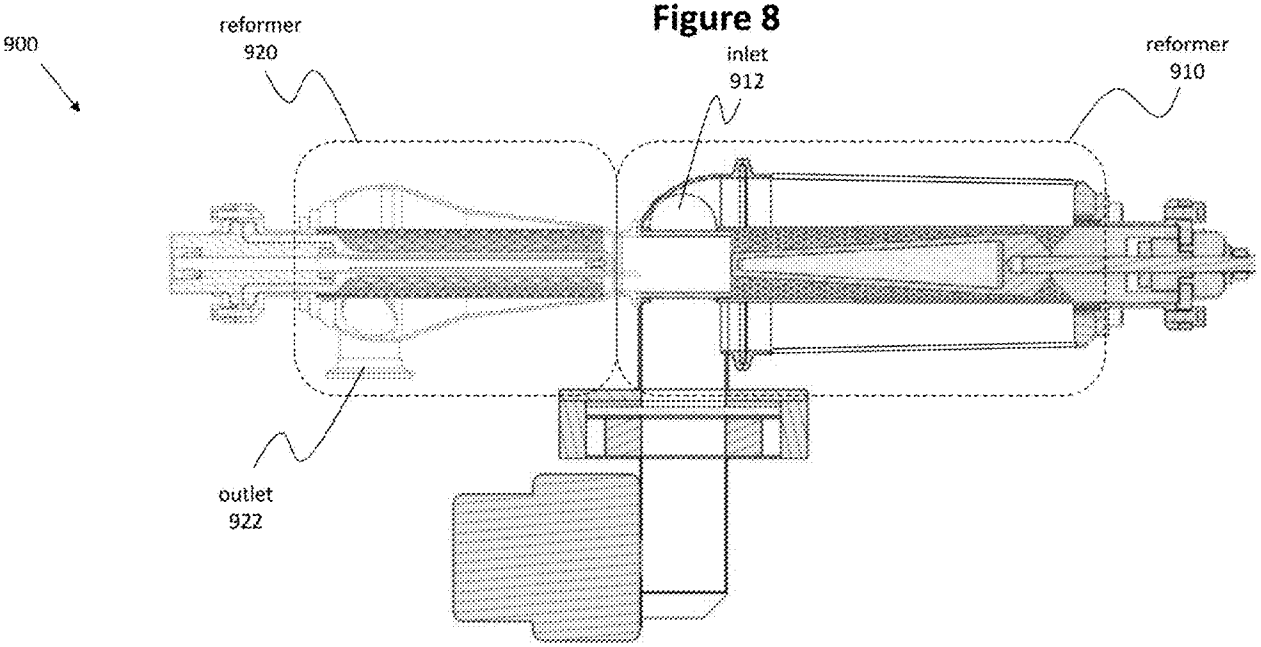
FIG. 9 shows a cross-sectional view of a plasma treatment system having two alternative reformers serially coupled to one another.

FIGS. 8-9 show cross-sectional views of exemplary chained reformers that each produce different plasmas. FIG. 8 shows a plasma treatment system 800 having an inlet 812 into a glide-arc plasma reformer 810 that feeds into a DBD plasma reformer 820 to an outlet 822. FIG. 9 shows a plasma treatment system 900 having an inlet 912 into a glide-arc plasma reformer 910 with a microwave generator that feeds into a DBD plasma reformer 920 to an outlet 922. Many alternative geometries and serial paths could be adapted from the designs presented.

Figure 12:
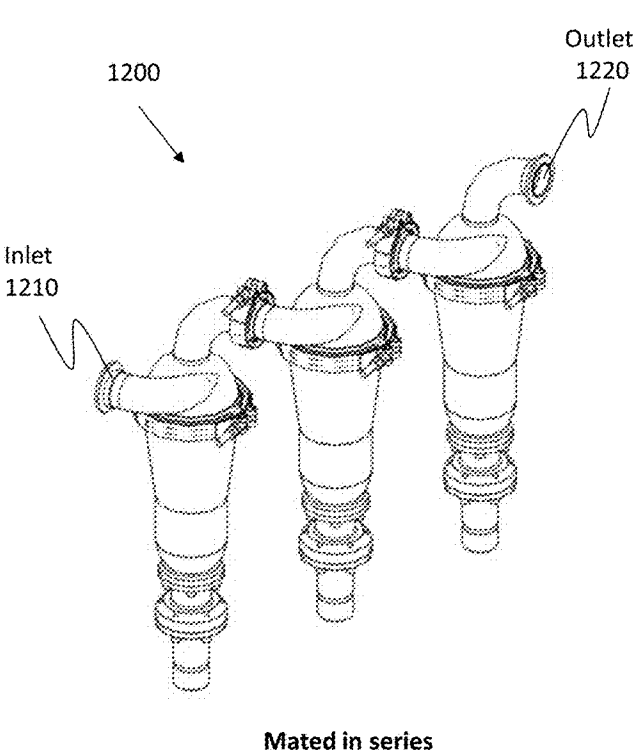
FIG. 12 shows an exterior plan view of three reformers serially coupled to one another.
Figure 11:
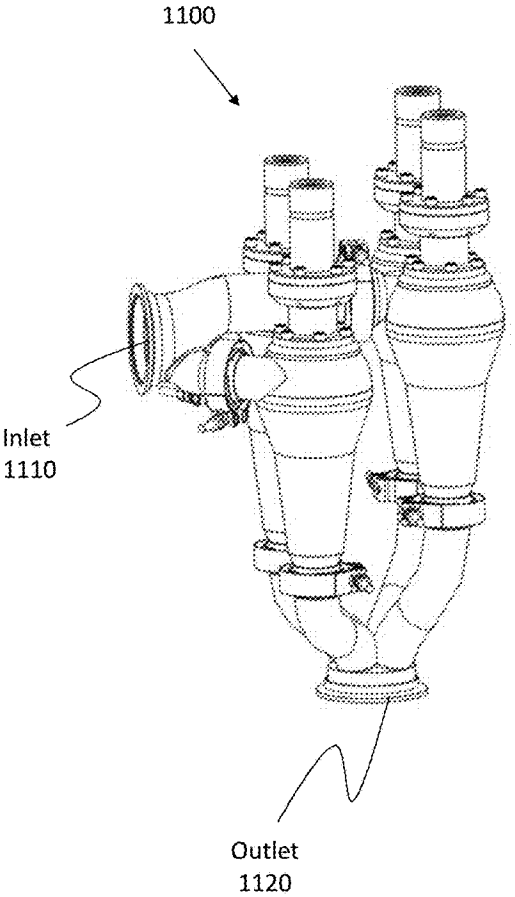
FIG. 11 shows an exterior plan view of four reformers coupled to one another in parallel.
Figure 10:
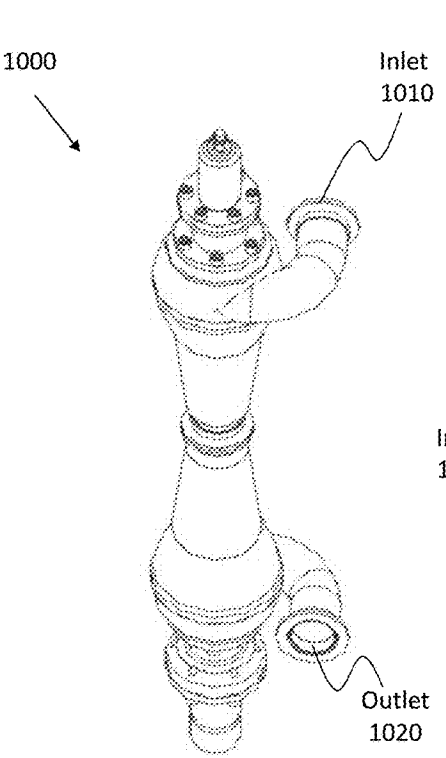
FIG. 10 shows an exterior plan view of two reformers serially coupled to one another.

For example, FIGS. 10-12 show alternative plan views of chained reformers. FIG. 10 shows a plan view of a chained plasma treatment system 1000 having inlet 1010 and outlet 1020 which is a representation of the cross-sectional view of plasma treatment system 800. FIG. 11 shows a plan view of a plasma treatment system 1110 with reformers coupled in parallel to one another, having a single inlet 1110 leading to four separate reformers, whose output streams are joined at outlet 1120. FIG. 12 shows a plan view of a plasma treatment system 1200 with three reformers joined in serial having inlet 1210 and outlet 1220. Plasma treatment system 1200 could be utilized with three different sets of electrodes to provide three different plasmas, or could have the same electrodes to utilize the same plasma in an extended reformation cycle.

Figure 13:
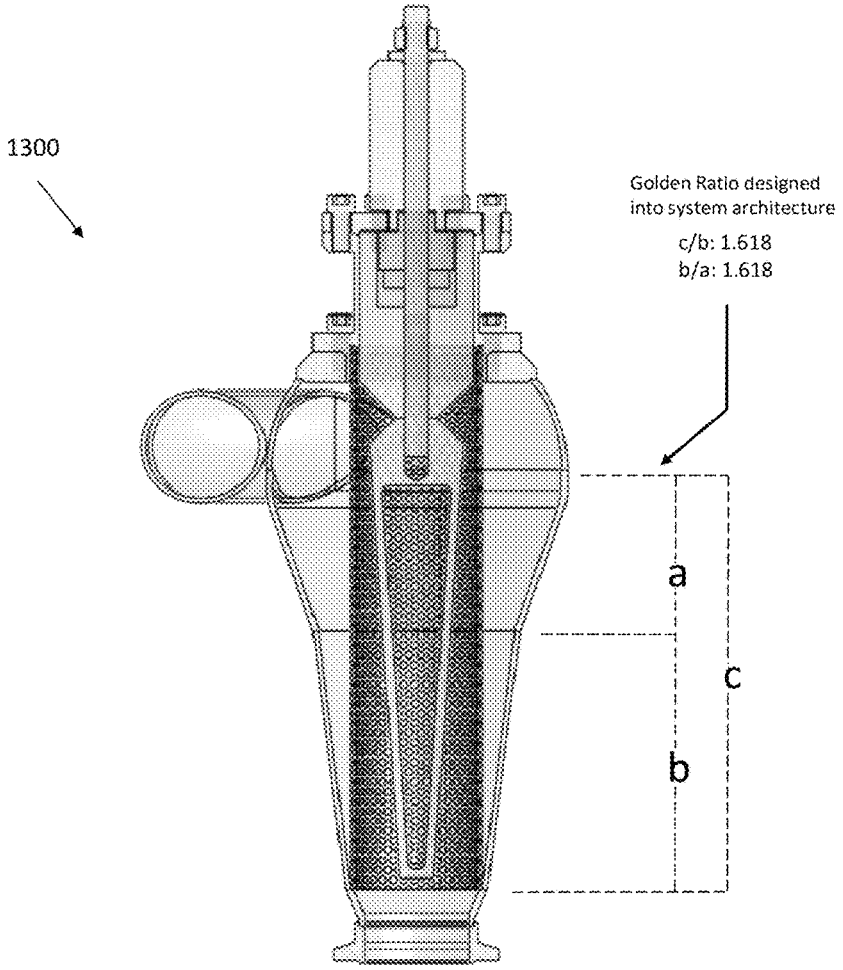
FIG. 13 shows a cross-sectional view of a reformer having an outer housing having geometric features that adhere to the golden ratio.

FIG. 13 shows a reformer 1300 having a golden ratio designed into the exterior walls of the outer housing, with dimension a for the first length of the first tapered section from the inlet to a second tapered section, dimension b for the second length of the second tapered section from the first tapered section to the base, and dimension c for the total length of both the first and second tapered sections. Experimental data has revealed that utilizing this golden ratio of a to b and b to c provides for an advantageous stream path along the interior wall of reformer 1300.

Figure 14:
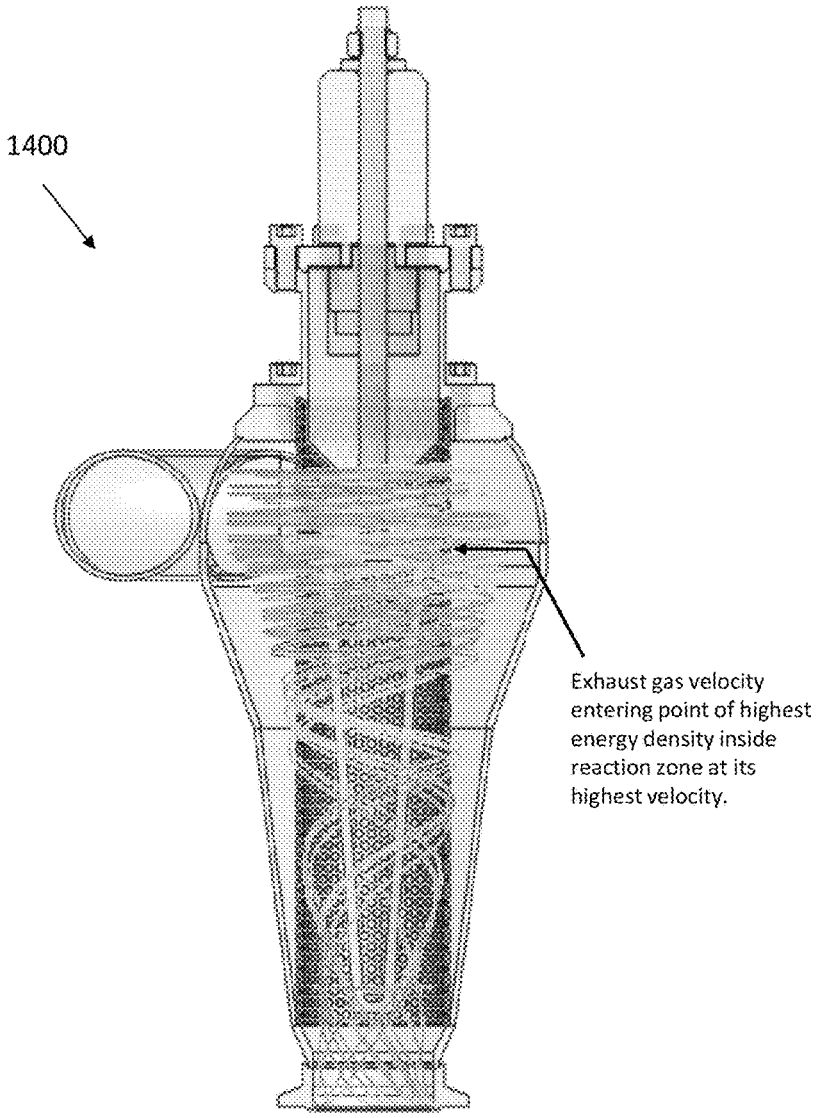
FIG. 14 shows a cross-sectional view of a reformer with the path and velocity of the gas stream highlighted.
Figure 15:
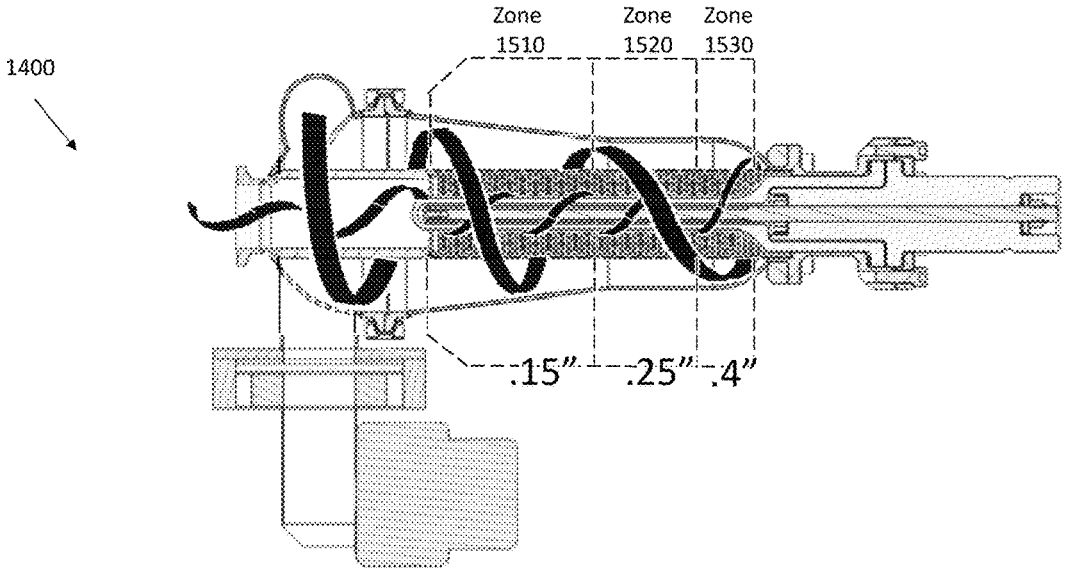
FIG. 15 shows a cross-sectional view of the reformer of FIG. 14.
Figure 16:
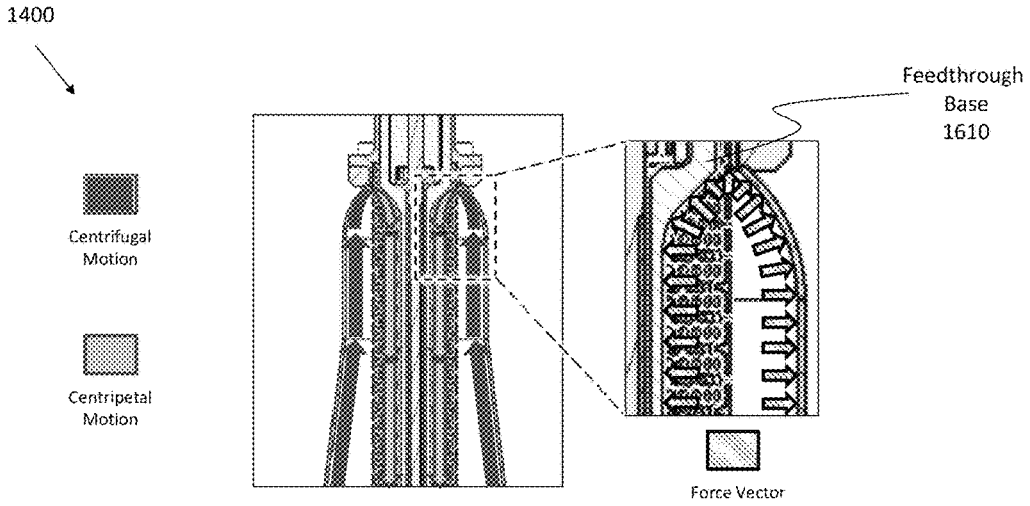
FIG. 16 shows a blown-up cross-sectional view of a portion of the reformer of FIG. 15.

FIGS. 14-16 illustrate a reformer 1400 having an input gas stream path whose velocity enters the point of the highest energy density inside the reaction zone at its highest velocity. FIG. 14 illustrates the input gas stream path as having a high density at the top as it enters the reformer, decreasing in density as it travels down to the base of the inner electrode. FIG. 15 shows how reformer 1400 has been divided into three pressure zones—low pressure zone 1510, medium pressure zone 1520, and high pressure zone 1530, which forces the stream path to naturally flow and operate in the low pressure zone 1510. Low pressure zone 1510 is generated by altering the surface features of either the outside electrode or the inner surface wall of the outer housing, or both. Here, the outside electrode in zone 1510 has perforations spaced a distance of 0.15" from one another, zone 1520 has perforations spaced a distance of 0.25" from one another, and zone 1530 has perforations spaced a distance of 0.4" from one another. Differing the spacing of the perforations varies the air pressure zones along the path of the input stream, focusing the input stream towards areas of highest energy density at its highest velocity. FIG. 16 shows how the highest density particulate matters hug the inner wall of the outer housing as the vortex travels down towards the base of the inner electrode. Both centrifugal motion and centripetal motion help to direct the stream accordingly.

Figure 18:
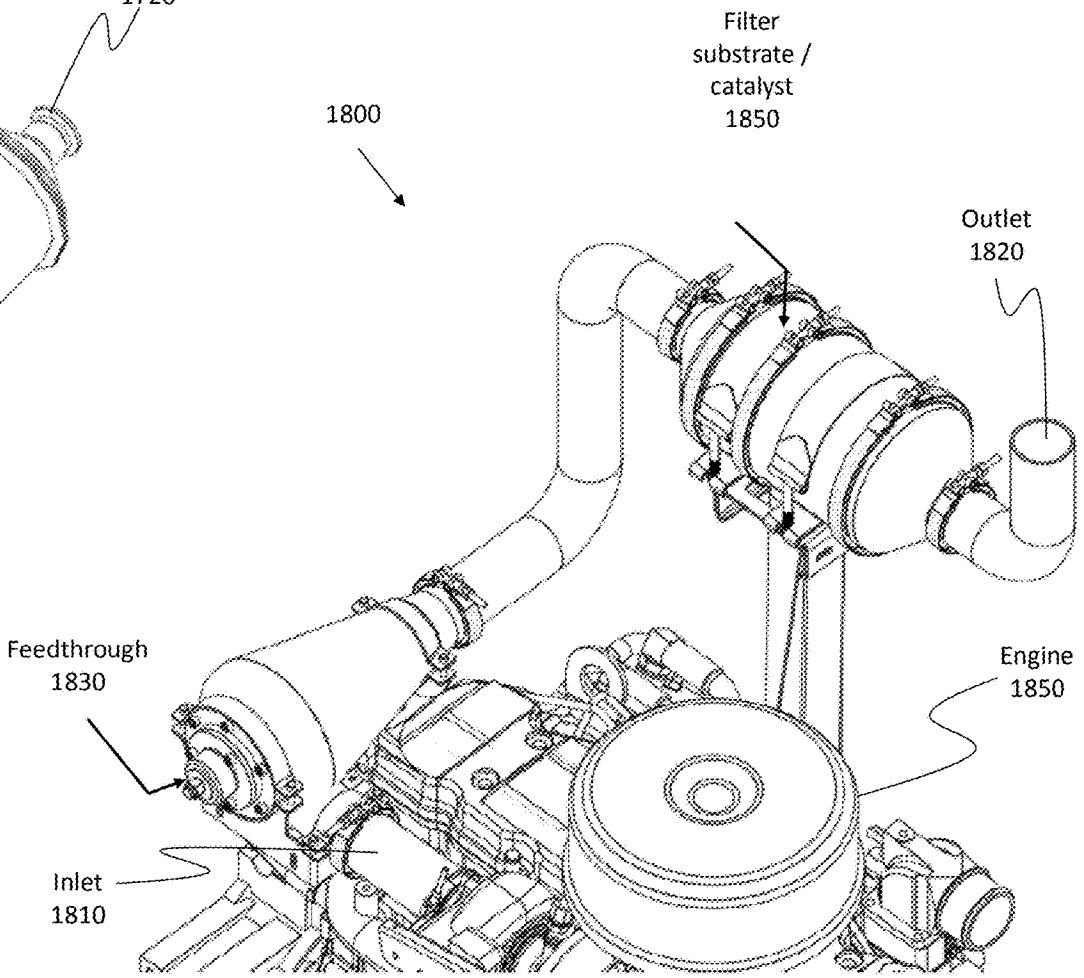
FIG. 18 shows an exterior plan view of an alternative plasma exhaust system having a filter/catalyst system placed above both the reformer and an internal combustion engine.
Figure 17:
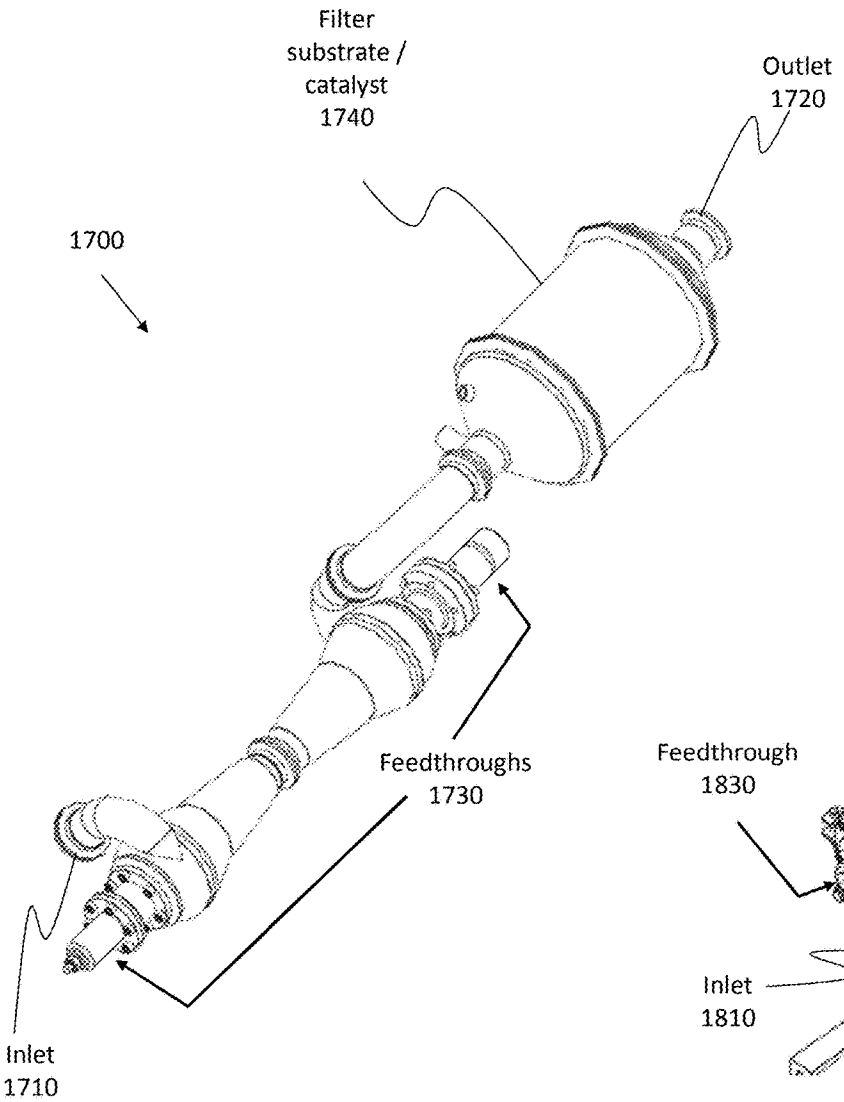
FIG. 17 shows an exterior plan view of a plasma exhaust system having a filter/catalyst system placed above the reformer.

FIGS. 17-18 illustrate alternative embodiments where a filter substrate and/or catalyst, such as particulate filters (PF), diesel oxidation catalysts (DOC) or selective catalytic reduction (SCR) can be placed above either the reactor, an engine, or both to use heat exchange to increase the production efficiency of the radicals.

Figure 19:
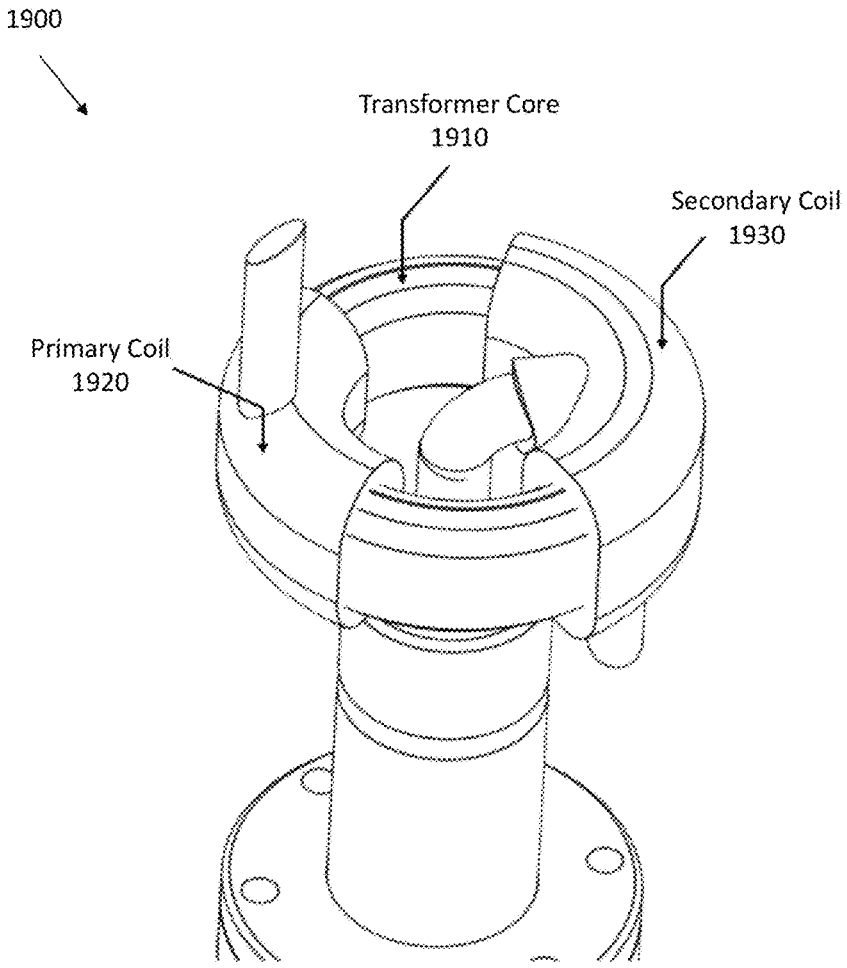
FIG. 19-20 shows a plasma exhaust system having a transformer core coupled directly to a feed through of a reformer.
Figure 20:
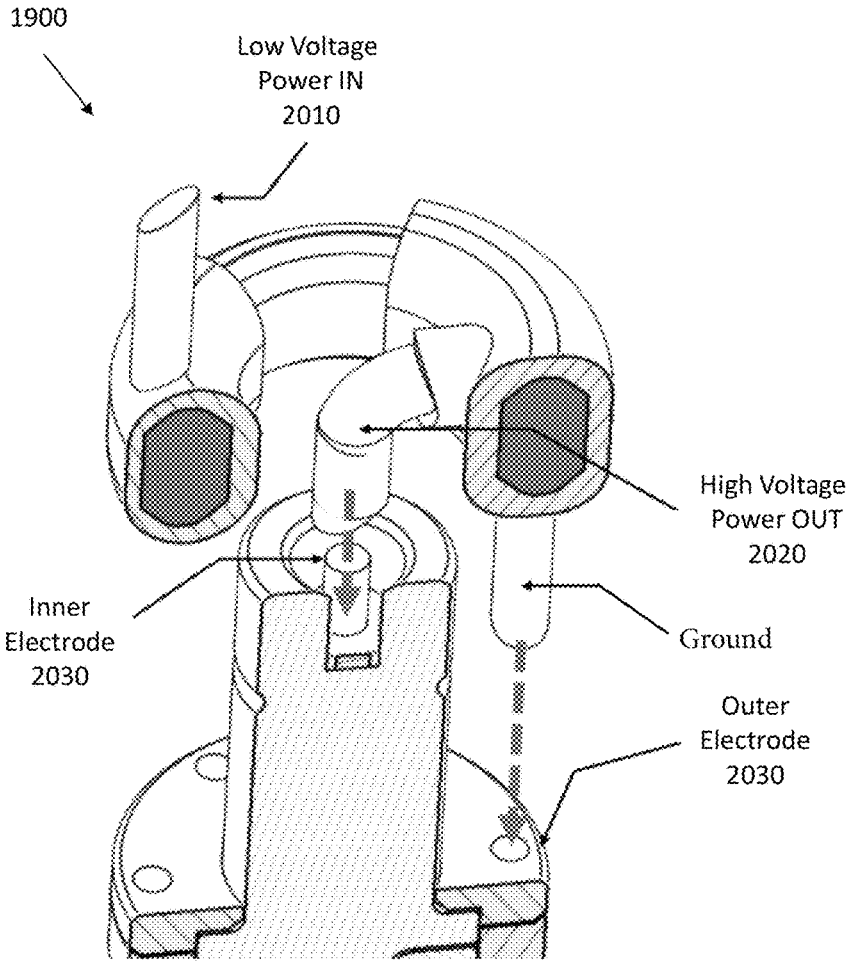

FIGS. 19-20 illustrate a plasma treatment system 1900 having a transformer core 1910 that is directly coupled to the reformer to deliver high voltage power directly to the inner and outer electrode. Here, the transformer core 1910 is coupled directly to the inner and outer electrodes of the reformer with primary coil 1920 and secondary coil 1930 transforming the low voltage power input 2010 to high voltage power out. Ground from the high voltage power out 2020 is coupled directly to inner electrode 2030 while the positive VDD from high voltage power out 2020 is coupled directly to outer electrode 2030 to provide a voltage potential directly to the electrodes.

Figure 21:
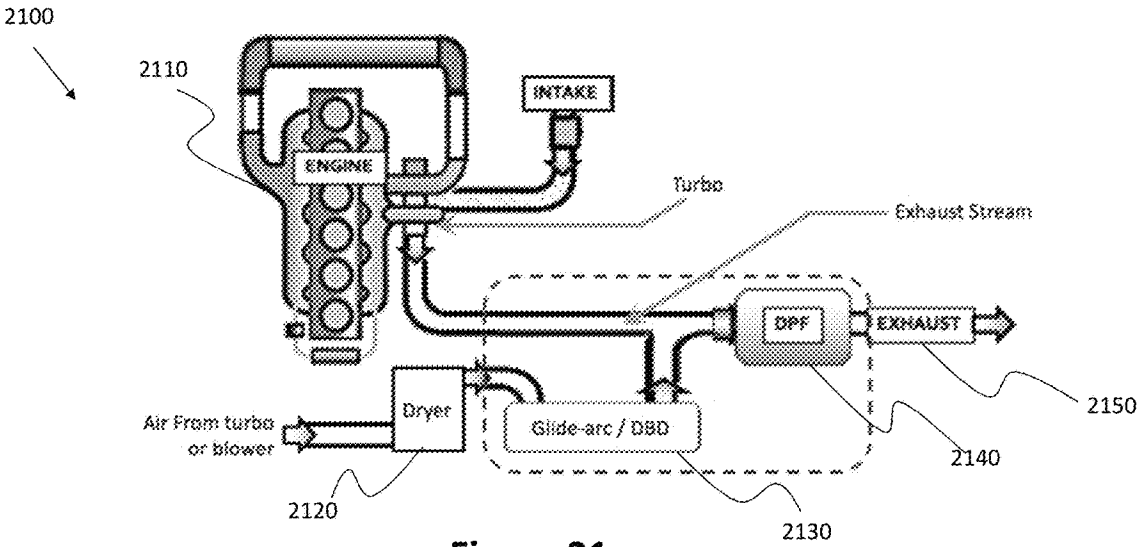
FIG. 21-23 show different embodiments of plasma exhaust systems having air driers introducing dried air to the reformers and having waste heat exchange with the exhaust stream and filter/catalyst.
Figure 22:
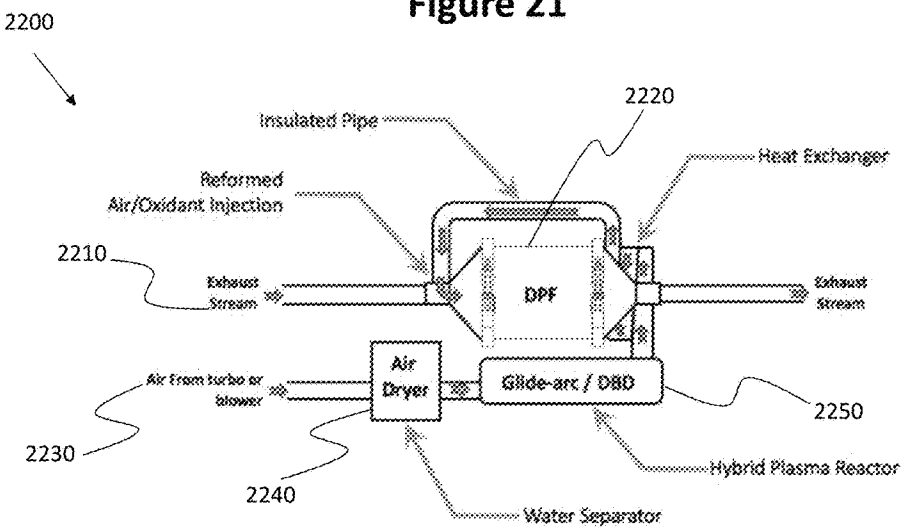
Figure 23:
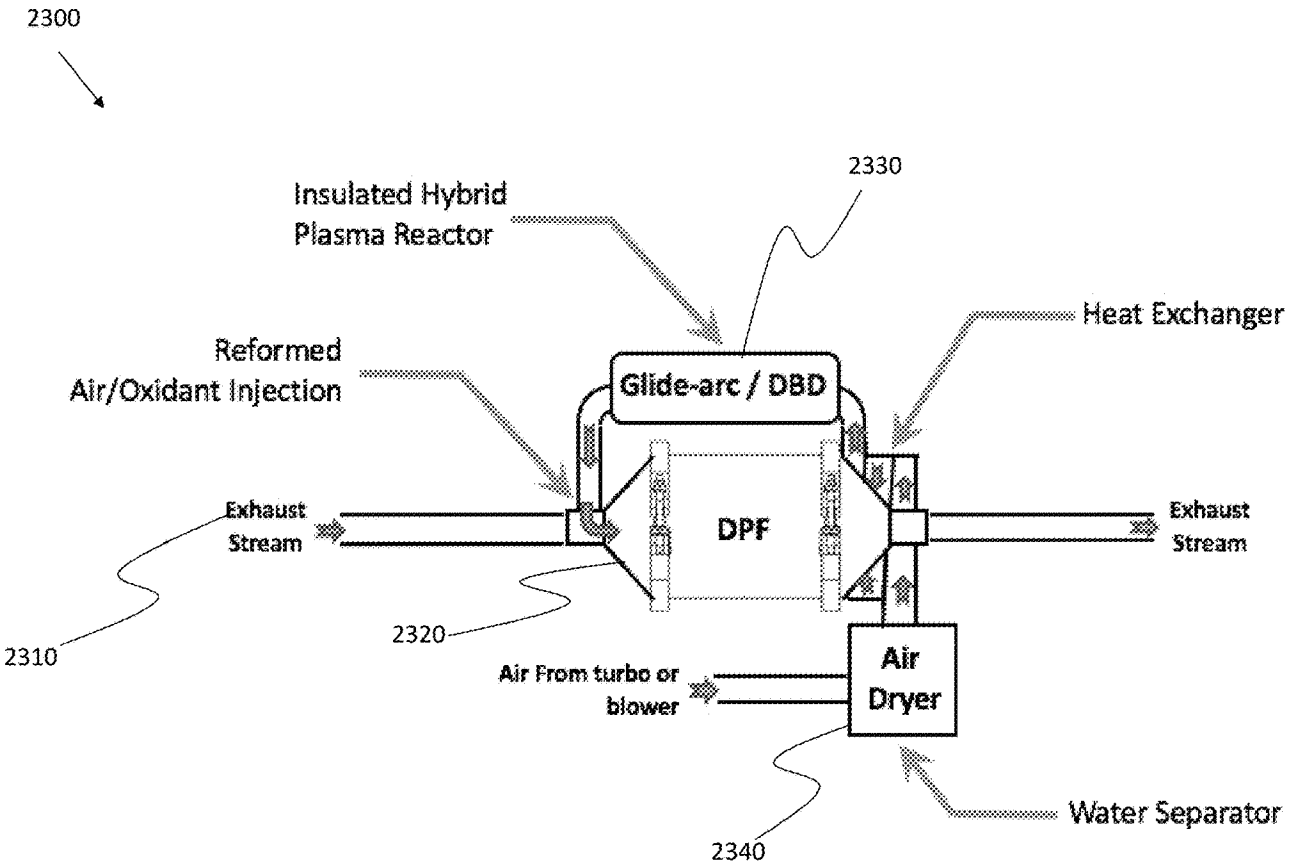

FIGS. 21-23 illustrate additional configurations of plasma treatment systems. In FIG. 21, plasma treatment system 2100 treats exhaust from an internal combustion engine 2110. Air from an air source, such as from a blower or a turbocharger, is received by dryer 2120, which minimizes the formation of unwanted acidic chemicals by removing hydrogen and sulfur sources from ambient air and sends a stream of dried air to reformers 2130. Preferably, dryer 2120 uses a dessicant or some other dryer to remove hydrogen and sulfur sources from the air. Reformers 2130 generates plasma to form radicals, such as $NO_2$ radicals, $O_1$, and $O_3$, which combine with the exhaust stream from internal combustion engine 2110 to reform substances within the exhaust stream as well as to oxidize soot captured in Diesel Particulate Filter (DPF) 2140. By placing DPF 2140 above heat-producing reformer 2130, plasma treatment system 2100 uses heat exchange properties to increase the production efficiency of the radicals.

In FIG. 22, plasma treatment system 2200 receives an exhaust stream 2210 from a source (not shown), which is passed immediately through DPF 2220. Air from an input air stream 2230 is passed through air dryer 2240 to be fed into reformers 2250, which transmits radicals to the input stream 2210 before the input stream is filtered by DPF 2220. Here, heat is recaptured in several areas: (1) heat is recaptured by the heat exchanger recapturing heat from the output exhaust stream from DPF 2220, (2) heat is recaptured by placing DPF 2220 above reactors 2250, and (3) heat is recaptured by placing the pipe from reactors 2250 to the input exhaust stream 2210 above DPF 2220.

In FIG. 23, plasma treatment system 2300 receives an exhaust stream 2310 from a source (not shown), which is, again, passed through DPF 2220. In this embodiment, output radicals from reformers 2230 are, again, introduced to exhaust stream 2310 prior to the exhaust stream being filtered through DPF, reforming some of the particles from exhaust stream 2310. Here, reformers 2330 are placed above DPF 2320, helping to recapture and utilize some of the heat from DPF 2320, as well as from the output exhaust stream from DPF 2320 via the heat exchanger running from air dryer 2340 to reformers 2330.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

[1. A modular plasma treatment system, comprising:

a first outer housing of a first plasma reformer having a first exhaust inlet for receiving a first input gaseous stream and a first exhaust outlet for expelling a first output gaseous stream, wherein the first outer housing comprises a first housing inner receiving chamber;

a first outer electrode sized and dimensioned to abut first housing portions of the first housing inner receiving chamber such that the first outer electrode does not substantially move when set in place within the first housing inner receiving chamber, wherein the first outer electrode comprises a first electrode inner receiving chamber;

a second outer electrode sized and dimensioned to abut the first housing portions of the first housing inner receiving chamber such that the second outer electrode does not substantially move when set in place within the first housing inner receiving chamber, wherein the second outer electrode comprises a second electrode inner receiving chamber;

a first inner electrode sized and dimensioned to abut first electrode portions of the first electrode inner receiving chamber such that the first inner electrode does not substantially move when set in place within the first electrode inner receiving chamber; and a second inner electrode sized and dimensioned to abut second electrode portions of the second electrode inner receiving chamber such that the second inner electrode does not substantially move when set in place within the second electrode inner receiving chamber.]

[2. The modular plasma treatment system of claim 1, wherein the first housing inner receiving chamber and a first exterior portion of the first outer electrode comprise self-centering features that center the first outer electrode with respect to the first outer housing as the first outer electrode is set in place within the first housing inner receiving chamber.]

[3. The modular plasma treatment system of claim 2, wherein the self-centering features comprise a tapered wall of the first housing inner receiving chamber that centers the first and second outer electrodes when either is set in place within the first housing inner receiving chamber.]

[4. The modular plasma treatment system of claim 2, wherein the self-centering features comprise a tapered exterior cross-section of the first outer electrode that widens against the first housing portions of the first housing inner receiving chamber as the first outer electrode is set in place within the first housing inner receiving chamber.]

[5. The modular plasma treatment system of claim 1, wherein the first electrode inner receiving chamber and a first exterior portion of the first inner electrode comprise self-centering features that center the first inner electrode with respect to the first inner electrode inner receiving chamber as the first inner electrode is set in place within the first inner electrode inner receiving chamber.]

[6. The modular plasma treatment system of claim 5, wherein the self-centering features comprise a tapered wall of the first electrode inner receiving chamber that centers the first inner electrode when the first inner electrode is set in place within the first electrode inner receiving chamber.]

[7. The modular plasma treatment system of claim 5, wherein the self-centering features comprise a tapered exterior cross-section of the first inner electrode that widens against the first electrode portions of the first electrode inner receiving chamber as the first inner electrode is set in place within the first electrode inner receiving chamber.]

[8. The modular plasma treatment system of claim 1, wherein the first outer electrode and the first inner electrode, when set in place within the first housing inner receiving chamber, are configured to provide a first plasma gap for a first plasma and wherein the second outer electrode and the second inner electrode, when set in place within the first housing inner receiving chamber, are configured to provide a second plasma gap for a second plasma different from the first plasma.]

[9. The modular plasma treatment system of claim 1, wherein the first plasma reformer comprises a dielectric barrier discharge plasma reformer to generate a dielectric barrier discharge plasma.]

[10. The modular plasma treatment system of claim 9, wherein the first outer electrode comprises interior conductive formertions to generate electric field gradients between points of the conductive projections.]

[11. The modular plasma treatment system of claim 10, wherein the interior conductive projections comprise conductive screw tips screwed into holes of the first outer electrode.]

[12. The modular plasma treatment system of claim 10, wherein at least two of the interior conductive projections comprise different dimensions from one another to provide different electric field gradients to precipitate particulate matter having different properties.]

[13. The modular plasma treatment system of claim 9, wherein the first exhaust inlet comprises surface features that alter air pressure within an excitation chamber of the first plasma reformer to direct the first input gaseous stream in a cyclone motion to points of highest energy density inside the excitation chamber.]

[14. The modular plasma treatment system of claim 13, wherein the first plasma reformer comprises a rotating glide arc reformer and the second plasma reformer comprises a DBD plasma reformer, at least one of the first outer electrode and the first inner electrode rotate a textured surface to direct the first input gaseous stream in a cyclone motion to points of highest energy density inside an excitation chamber of the rotating glide arc reformer.]

[15. The modular plasma treatment system of claim 14, further comprising coaxial electrodes that discharge into each of the glide-arc plasma and the DBD plasma.]

[16. The modular plasma treatment system of claim 1, further comprising:

a second outer housing of a second plasma reformer having a second exhaust inlet for receiving a second input gaseous stream and a second exhaust outlet for expelling a second output gaseous stream, wherein the second outer housing comprises a second housing inner receiving chamber;

a third outer electrode sized and dimensioned to abut second housing portions of the second housing inner receiving chamber such that the third outer electrode does not substantially move when set in place within the second housing inner receiving chamber, wherein the third outer electrode comprises a third electrode inner receiving chamber;

a fourth outer electrode sized and dimensioned to abut the second housing portions of the second housing inner receiving chamber such that the fourth outer electrode does not substantially move when set in place within the second housing inner receiving chamber, wherein the fourth outer electrode comprises a fourth electrode inner receiving chamber;

a third inner electrode sized and dimensioned to abut third electrode portions of the third electrode inner receiving chamber such that the third inner electrode does not substantially move when set in place within the third electrode inner receiving chamber; and a fourth inner electrode sized and dimensioned to abut fourth electrode portions of the fourth electrode inner receiving chamber such that the fourth inner electrode does not substantially move when set in place within the fourth electrode inner receiving chamber, wherein the first output gaseous stream feeds the second input gaseous stream.]

[17. The modular plasma treatment system of claim 16, wherein the rotating glide arc reformer generates a glide-arc plasma and the DBD plasma reformer generates a DBD plasma.]

[18. The modular plasma treatment system of claim 17, further comprising a magnetic field generator that generates a magnetic field around the co-axial electrodes.]

[19. The modular plasma treatment system of claim 18, wherein the first outer housing of the first plasma reformer is disposed above a particulate filter expelling the first output gaseous stream to transfer waste heat from the first output gaseous stream to an oxidant conduit.]

[20. The modular plasma treatment system of claim 19, wherein the air source comprises at least one of a blower and an on-board turbocharger.]

[21. The modular plasma treatment system of claim 1, wherein the plasma treatment system oxidizes particulate matter in a reaction zone between the first inner electrode and the first outer electrode.]

[22. The modular plasma treatment system of claim 21, wherein the air dryer uses a desiccant to remove water vapor from the intake air.]

[23. The modular plasma treatment system of claim 1, further comprising an air drier that receives intake air from an air source and outputs dried air, wherein the first exhaust inlet receives the dried air and outputs oxidants to the first output gaseous stream.]

[24. The modular plasma treatment system of claim 1, further comprising a voltage transformer integrated with a feedthrough of the first plasma reformer to deliver power from the voltage power transformer to the first outer electrode and the first inner electrode.]

[25. The modular plasma treatment system of claim 1, further comprising a fuel injector that injects fuel into the first input gaseous stream.]

[26. The modular plasma treatment system of claim 25, wherein the first plasma reformer comprises at least one of a DBD reformer and a rotating glide-arc reformer.]

[27. The modular plasma treatment system of claim 1, further comprising a microwave generator that generates microwaves directed towards the first outer housing.]

*28. A method of treating a gas stream, the method comprising:*

*directing the gas stream into a first reaction zone;*

*energizing the gas stream to generate a first plasma comprising a dielectric barrier discharge (DBD) plasma between a first inner electrode nested within a second electrode in the first reaction zone;*

*further energizing, within a second reaction zone, the gas stream energized in the first reaction zone to generate a second plasma comprising one of a rotating glide-arc plasma or a microwave plasma,*

*wherein the first and second reaction zones are disposed serially such that the first inner electrode is directly coupled to a common reaction zone common to the first and second reaction zones and configured to sustain therein the first plasma.*

*29. The method of claim 28, wherein the gas stream comprises a hydrocarbon.*

*30. The method of claim 28, wherein the gas stream is treated to produce hydrogen.*

*31. The method of claim 28, wherein the first inner electrode contacts the second plasma in the common reaction zone.*

*32. The method of claim 28, wherein the first reaction zone is in linear sequence to the second reaction zone.*

*33. The method of claim 28, wherein a dielectric layer is disposed between the first inner electrode and the second electrode.*

*34. The method of claim 28, wherein the rotating glide-arc plasma is generated in the second reaction zone.*

*35. The method of claim 34, wherein the rotating glide-arc plasma is formed between a third electrode nested within a fourth electrode, and wherein a gap between the third and fourth electrode increases along an axis of the third electrode.*

*36. The method of claim 28, wherein the DBD plasma is generated in linear sequence to the second plasma.*

*37. The method of claim 28, further comprising generating a low pressure zone within the first reaction zone.*

*38. The method of claim 37, wherein the low pressure zone is downstream of the gas stream energized in the first reaction zone.*

*39. The method of claim 37, wherein the low pressure zone is downstream of the DBD plasma.*

*40. The method of claim 28, further comprising an electric field gradient overlapping the first reaction zone, and wherein the second plasma is the microwave plasma.*

*41. The method of claim 28, further comprising directing the gas stream into a third reaction zone comprising a third plasma.*

*42. The method of claim 28, wherein the first inner electrode is arranged co-axially with the second electrode.*

*43. The method of claim 42, wherein a third plasma is formed by a third electrode arranged co-axially with a fourth electrode.*

*44. A method of generating a product from a gas stream, comprising:*

*energizing the gas stream in a first reaction zone, wherein the first reaction zone comprises a dielectric barrier discharge (DBD) plasma;*

*directing the energized gas stream into a second reaction zone, and further energizing the energized gas stream in the second reaction zone to generate therein a glide-arc plasma;*

*wherein a first inner electrode of the first reaction zone is directly coupled to a common reaction zone common to the first and second reaction zones and configured to sustain therein the glide-arc plasma; and*

*directing an exhaust comprising the product out of one of the first or the second reaction zones.*

*45. The method of claim 44, wherein the product is hydrogen and the gas stream comprises a hydrocarbon.*

*46. The method of claim 44, wherein the DBD plasma is formed between the first inner electrode coaxial with a second electrode, wherein a dielectric layer is disposed between the first inner electrode and the second electrode.*

*47. The method of claim 44, wherein the second reaction zone is downstream of the first reaction zone.*

*48. The method of claim 47, wherein the glide-arc plasma is formed between a third electrode coaxial with a fourth electrode, wherein a gap between the third electrode and the fourth electrode increases along an axis of the third electrode.*

*49. The method of claim 44, further comprising generating a third plasma different than the second plasma, wherein the third plasma is downstream from the second reaction zone.*

*50. A method of generating a product from a gas stream, comprising:*

*energizing the gas stream in a first reaction zone;*

*directing the energized gas stream into a second reaction zone, and further energizing the energized gas stream to generate a second plasma;*

*wherein one of the first reaction zone or the second reaction zone comprises a glide-arc plasma,*

*wherein a first inner electrode of the first reaction zone is directly coupled to a common reaction zone common to the first and second reaction zones and configured to sustain therein the glide-arc plasma, and*

*wherein the gas stream is energized in the first reaction zone by the first inner electrode nested within a second electrode; and*

*directing an exhaust comprising the product out of one of the first or the second reaction zones.*

*51. A plasma device, comprising:*

*a first reaction zone configured to energize a gas stream using a first electrode co-axial with a second electrode;*

*a second reaction zone configured to generate a plasma using a third electrode co-axial with a fourth electrode, wherein a gap between the third and fourth electrodes increases along an axis of the third electrode;*

*wherein the first electrode is directly coupled to a common reaction zone common to the first and second reaction zones and configured to sustain therein the plasma; and*

*a microwave generator directed toward the second reaction zone.*

*52. The plasma device of claim 51, wherein the first electrode is upstream of the third electrode.*

*53. The plasma device of claim 51, wherein the first electrode comprises a dielectric layer on a surface facing the second electrode.*

*54. The plasma device of claim 51, wherein the second reaction zone is downstream of the first reaction zone.*

*55. A method of treating a gas stream, the method comprising:*

*directing the gas stream into a first reaction zone;*

*generating, within the first reaction zone, an energized gas stream;*

*directing the energized gas stream toward a plasma in a second reaction zone, wherein a first electrode of the first reaction zone is directly coupled to a common reaction zone common to the first and second reaction zones and configured to sustain therein the plasma, and wherein a gap between the first electrode and a second electrode in the first reaction zone increases along an axis of the first electrode;*

*directing a microwave at the second reaction zone; and*

*reforming the gas stream in the second reaction zone to form a product.*

*56. The method of claim 55, wherein the microwave is directed toward an inlet of the second reaction zone.*

*57. The method of claim 55, wherein the microwave is directed toward an outlet of the second reaction zone.*

*58. The method of claim 55, wherein the microwave is directed toward the first and second reaction zones.*

*59. The method of claim 55, further comprising using a waveguide to direct the microwave at one of the first reaction zone, an inlet of the first reaction zone, an outlet of the first reaction zone, the energized gas stream, or the plasma.*

* * * * *